(12) United States Patent
Drucker et al.

(10) Patent No.: US 7,134,756 B2
(45) Date of Patent: Nov. 14, 2006

(54) SELECTABLE PROJECTOR AND IMAGING MODES OF DISPLAY TABLE

(75) Inventors: Steven M. Drucker, Bellevue, WA (US); Curtis Glenn Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 10/838,283

(22) Filed: May 4, 2004

(65) Prior Publication Data

US 2005/0248729 A1 Nov. 10, 2005

(51) Int. Cl.
 G03B 21/14 (2006.01)
 G03B 21/28 (2006.01)
(52) U.S. Cl. .......................... 353/77; 353/79; 353/119
(58) Field of Classification Search ............ 353/70–71, 353/77, 79, 119; 348/836, 838, 14.01, 14.11, 348/14.16
 See application file for complete search history.

(56) References Cited

U.S. PATENT DOCUMENTS

| | | | | | |
|---|---|---|---|---|---|
| 2,391,879 | A | * | 1/1946 | Chambers | 353/71 |
| 3,885,868 | A | * | 5/1975 | Hadzimihalis | 353/71 |
| 4,331,397 | A | * | 5/1982 | Jewison et al. | 353/71 |
| 4,992,650 | A | | 2/1991 | Somerville | 235/462 |
| 2004/0165060 | A1 | * | 8/2004 | McNelley et al. | 348/14.01 |
| 2005/0237382 | A1 | * | 10/2005 | White | 348/14.16 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

(Continued)

*Primary Examiner*—Christopher Mahoney
(74) *Attorney, Agent, or Firm*—Ronald M. Anderson

(57) ABSTRACT

A display table contains a projector that can either project an image onto a display surface of the display table or onto an external surface that is separate from the display table. A user can change the path of the light from the projector from the display surface to the external surface, either by rotating the projector to an appropriate position, or by moving a mirror into the path of light from the projector. A video camera included in the display table also has dual functionality and can selectively be used either to image objects on or above the display surface, or objects that are not adjacent to the display surface. A panel in the housing of the table is opened, and either the video camera is pivoted or a mirror is moved into its light path. Imaging a user with the video camera is useful for video conferencing.

17 Claims, 8 Drawing Sheets

OTHER PUBLICATIONS

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. 201 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Stamer, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plant Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003, 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

\* cited by examiner

SELECTABLE PROJECTOR AND IMAGING MODES OF DISPLAY TABLE

FIELD OF THE INVENTION

The present invention generally pertains to selectively modifying the projection path of a video image, and more specifically, pertains to a display system having the capability of enabling a user to selectively alter a light path for projecting a video image between a rear side of a display surface of the display system, and a separate surface that is not part of the display system.

BACKGROUND OF THE INVENTION

Many people enjoy viewing movies and other video images at their leisure, in the privacy of their homes, on television monitors or other types of display screens. The ready availability of recorded commercial movies as well as other video material on VHS tapes and more recently, on DVDs, has greatly increased the popularity of large screen televisions, and various types of monitors for viewing such video materials. In addition, a suitable video system can also be used for viewing digital photographs, over the air television programs, cable or satellite programming, and if coupled to an outside network through a suitable computing device, can even be used for browsing the Internet.

Others have taken the entertainment concept one step further by setting up a home theater system that employs a projector to project video images onto a screen mounted at the front of the room, or other appropriate surface. These projector systems provide excellent viewing quality while simulating a large screen, cinema-like experience. When setting a home theater projector system, however, a homeowner must face the relatively high cost of the projector and the problem of where to mount it. Many homeowners have chosen to mount the projector on the ceiling, which is expensive due to the time and labor necessary to mount it and hide the wiring used to provide power and a video signal to the projector. Furthermore, as a result of the complexity of this installation procedure, a homeowner most likely will be limited to viewing projected video images in a single room or area. It would therefore be desirable to enable the projection system to be more mobile and to reduce the overall cost of an entertainment system by combining the high cost projector with other components that enable multiple uses for the projector.

Prior art devices exist that incorporate a projector component in a display system that is usable with a computing device to view computer generated images, and also can readily be used for viewing movies on DVD or other video images. For example, a display platform was developed in the MIT Media Lab, as reported by Brygg Ullmer and Hiroshi Ishii in "The metaDESK: Models and Prototypes for Tangible User Interfaces," *Proceedings of UIST* 10/1997: 14–17. The metaDESK includes a near-horizontal graphical surface used to display two-dimensional geographical information. A computer vision system inside the desk unit (i.e., below the graphical surface) includes infrared (IR) lamps, an IR camera, a video camera, a video projector, and a pair of mirrors. The mirrors reflect the graphical image projected by the projector onto the underside of the graphical display surface, so that the image is viewable from above the display surface. Since a considerable portion of the cost of the metaDESK is for the projector, it would clearly be desirable to employ the projector to view images in larger perspective, by projecting the images onto a screen or adjacent wall. It would also be desirable to make the metaDESK more mobile, to enable it to be moved to a desired location where the images are projected onto a nearby wall or screen that is larger than the display surface of the metaDESK to be viewed in comfort.

Another prior art device was disclosed in several papers published by Jun Rekimoto of Sony Computer Science Laboratory, Inc. in collaboration with others. These papers briefly describe two display systems, which are referred to respectively as a "HoloWall" and a "HoloTable." Both of these display systems use a projector to project images onto a rear of a display surface. The rear projection panel, which is vertical in the HoloWall and horizontal in the HoloTable, is semi-opaque and diffusive, so that rear projected images are clearly visible. Again, it would be desirable to use this projector in the HoloWall or HoloTable to project video images onto a larger wall or screen that is separate from either of these systems.

The relatively expensive projector in these prior art display systems should preferably be selectively usable to display images either on the display surface included with the display system or on another external surface to provide more cost effective use of the projector. In addition, it should be relatively easy to changes modes from viewing the image on the display surface of the system, to viewing the image on the external surface. By thus switching viewing modes, a user would be able to enjoy a home theater projector experience, but in a more cost effective manner, since the projector is being utilized for more than one purpose, but would also enjoy the benefits of the display system when the projector is used to project images on the display panel. Providing the consumer with another mode for utilizing the expensive projector is more appealing to a consumer and ensures greater marketing opportunities for such a display system, since there is no need for the consumer to purchase a second projector for use in a home theater.

The metaDESK and the HoloTable and HoloWall display systems include a video camera that is used to image the surface of the display table to detect objects. However, it would be desirable to use the video camera in a second mode to image a person or persons sitting within the viewing range of the video camera, when the projector is being used to project an image onto the external surface. This arrangement would be useful in video conferencing, to enable a user to view an image of another person involved in the video conference, while the other person sees an image of the user provided by the video camera.

SUMMARY OF THE INVENTION

The present invention utilizes components of an interactive display system to perform multiple functions. A projector can be utilized not only to project a light path onto a display surface of the display system, but also to project an image onto a surface that is external to the display system. Similarly, a video camera can be selectively employed either to image objects on or near the display surface or to image objects that are in a different location.

More specifically, one aspect of the present invention is directed to a method for enabling a user to selectively operate a display table in one of two different modes, including a first mode in which a video image is projected on a display surface of the display table and a second mode in which the video image is projected onto a separate surface that is not part of the display table. The method includes the step of enabling the user to selectively change a projection light path for the video image between a first path that is used when operating the display table in the first mode, and a second path that is used when operating display table in the second mode. The video image is projected along the projection path selected by the user so that the video image is viewed on either the display surface or the separate surface, along either the first path or the second path that was selected by the user.

There are different ways to change the projection light path to select one of the modes. In a first embodiment, the user is enabled to move a projector that produces the video image from a first position that is used for the first mode, to a second position that is used for the second mode. Moving the projector in this manner changes the projection light path from the first path to the second path.

In a second embodiment, the user selectively changes the projection light path when selectively operating the display table in the second mode, by positioning a reflective surface to redirect the video image along the second path instead of along the first path. In this embodiment, it may be necessary for the user to move a panel of the display table out of the second path when operating the display table in the second mode, so that the video image is not prevented from reaching the separate surface by the panel.

The display system preferably includes a video camera that can be used for imaging an object that is external to the display table when operating in the second mode. In this case, the method can include the step of directing a field of view of the video camera along an imaging path that includes the display surface, when selectively operating the display system in the first mode. The video camera includes an IR filter that is employed when imaging the display surface in the first mode. If the user chooses to selectively operate the display system in the second mode, the user is enabled to move a reflective surface to redirect the imaging field of view along the different imaging path. In addition, the user may move a panel out of the field of view of the video camera, as well as move the IR filter out of the field of view of the video camera. Optionally, this method also includes the steps of enabling the user to move a video camera from a first orientation directed toward the display surface in the first mode, to a second orientation directed toward an external object in the second mode, moving a panel out of the field of view of the video camera, and moving the IR filter out of the field of view of the video camera.

Another aspect of the present invention is directed to a system that enables a user to selectively determine where a video image is to be projected. The system includes a display surface, and a projector, both of which are supported by a housing. The projector projects a video image along a light path. Means are included for enabling a user to change the system between a first mode and a second mode of operation by altering the light path. Specifically, in the first mode, the projector projects the video image onto the display surface, and in the second mode, the projector projects the video image onto a separate surface that is spaced apart from the housing. In the first embodiment, the projector is movably coupled to the housing, so that in the first mode, the project is oriented to project the video image along the light path, and the video image appears on the display surface. In the second mode, the projector is moved by a user to a different orientation, to project the video image onto the separate surface. The projector may be pivoted about an axis from a first position in the first mode, to a second position in the second mode.

In a second embodiment, a reflective surface is moved by a user to change the light path from the first mode to the second mode. The reflective surface is used in the first mode to reflect the video image onto the display surface, and is moved to a different orientation in the second mode, to reflect the video image onto a separate surface. Alternatively, the reflective surface is not in the light path in the first mode, but is moved into the light path in the second mode. In this embodiment, the light path passes through an opening in the housing, and the housing includes a panel that covers the opening in the first mode. In the second mode, the panel is moved out of the opening.

Again, the system optionally includes a video camera. In the second mode, the video camera captures an image of an object that is spaced apart from the housing, while in the first mode, the video camera captures an image of the display surface. The housing further includes an opening, and a panel that covers the opening in the first mode, but which is moved from the opening to enable the image of an object to be captured in the second mode. The video camera includes an IR filter that is moved out of an imaging path of the video camera by a user, when operating the system in the second mode. In addition, a reflective surface is moved into an imaging path of the video camera by a user in the second mode, and, in the second mode, this reflective surface redirects the image path from the display surface toward an object that is spaced apart from the housing. Alternatively, the video camera may be movably coupled to the housing, such that the video camera is selectively moved by a user from a first orientation directed toward the display surface, in the first mode, to a second orientation directed toward an external object, in the second mode.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4A:
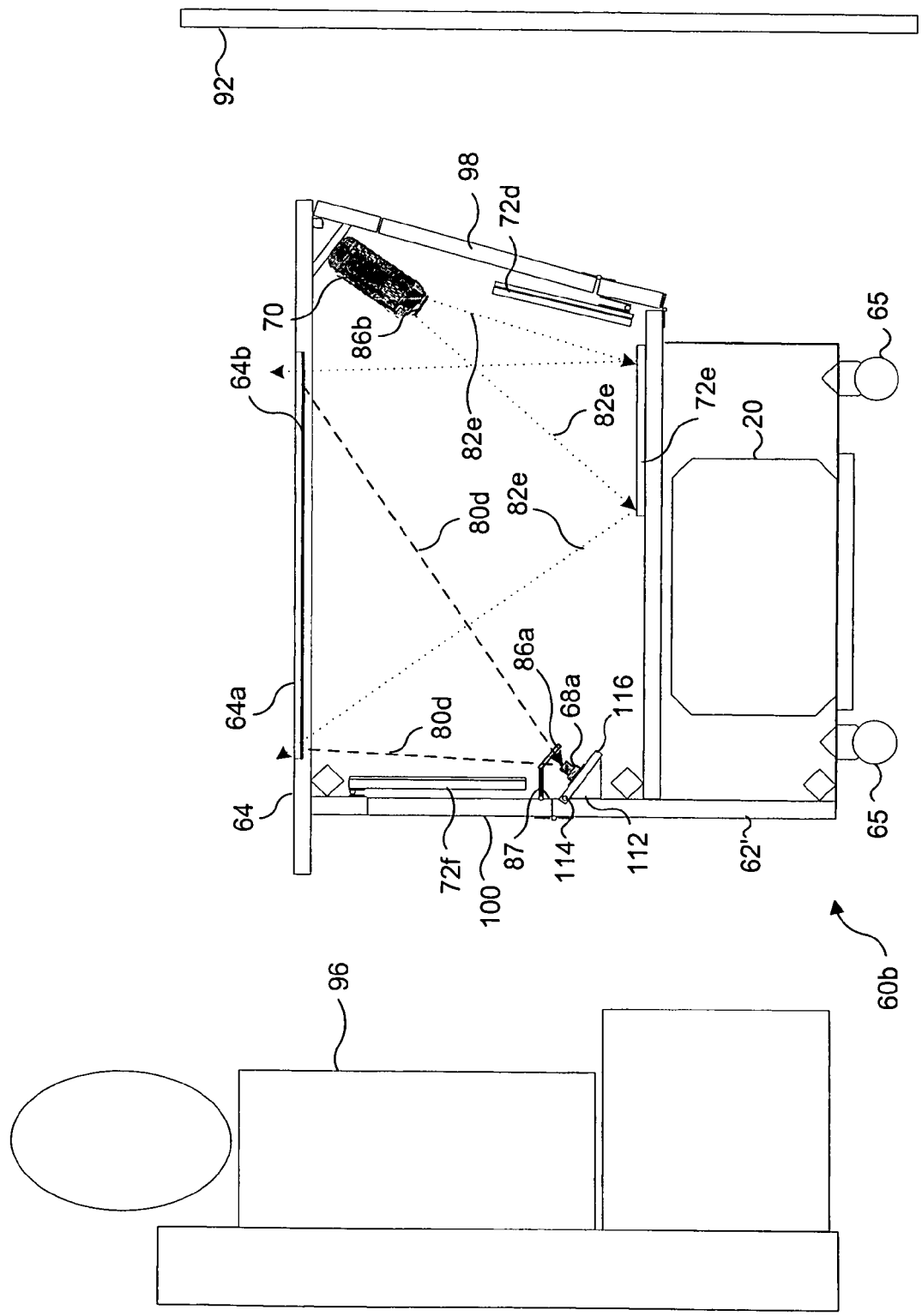
FIG. 4A is a side elevational cut-away view of a third preferred embodiment when operating in the first mode, showing the interior of the display table, the hardware components included, and placement and orientation of a projector and video camera, and the paths followed by light inside the display table.
Figure 4B:
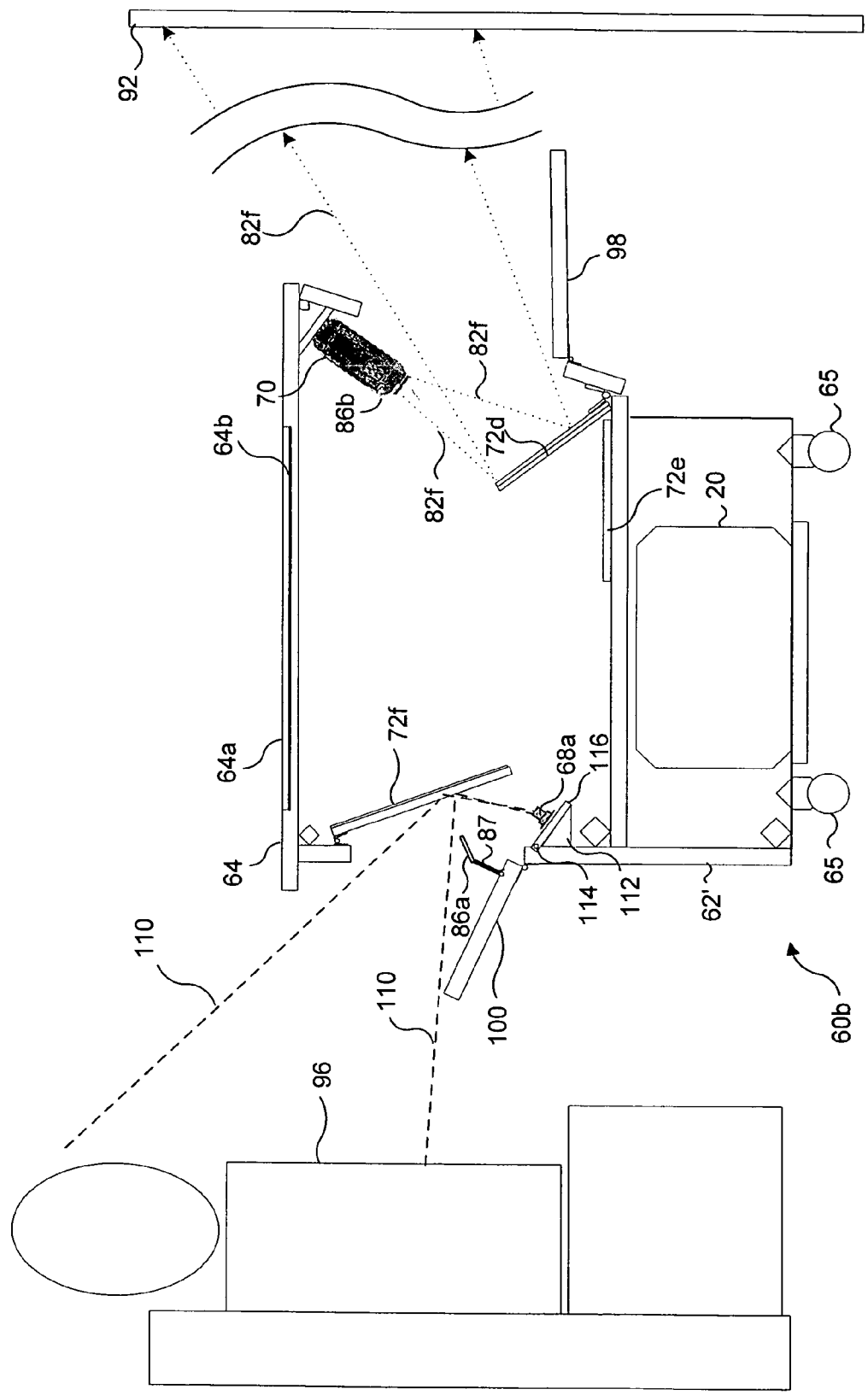
Figure 4C:
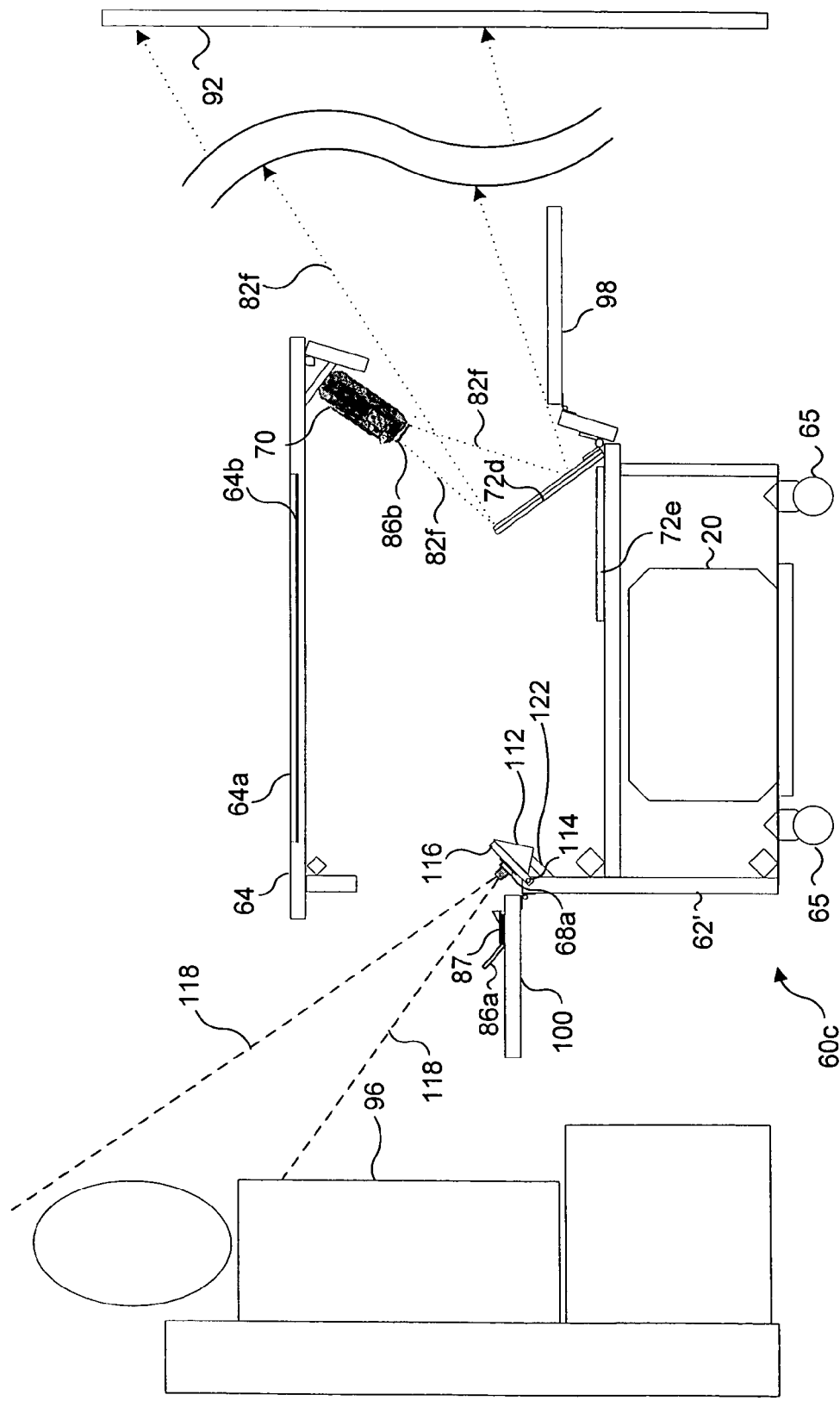

FIG. 4B is the third preferred embodiment of FIG. 4A, when operating in the second mode, showing the paths followed by light outside the display table and the paths followed by light traveling toward the video camera in the second mode; and FIG. 4C is an alternative configuration for the third preferred embodiment of FIG. 4A, showing how the video camera is repositioned, and the paths followed by light into the display table, to enable the video camera to capture an image of a person sitting next to the display table.

DESCRIPTION OF THE PREFERRED EMBODIMENT

Exemplary System for Implementing Present Invention

Figure 1:
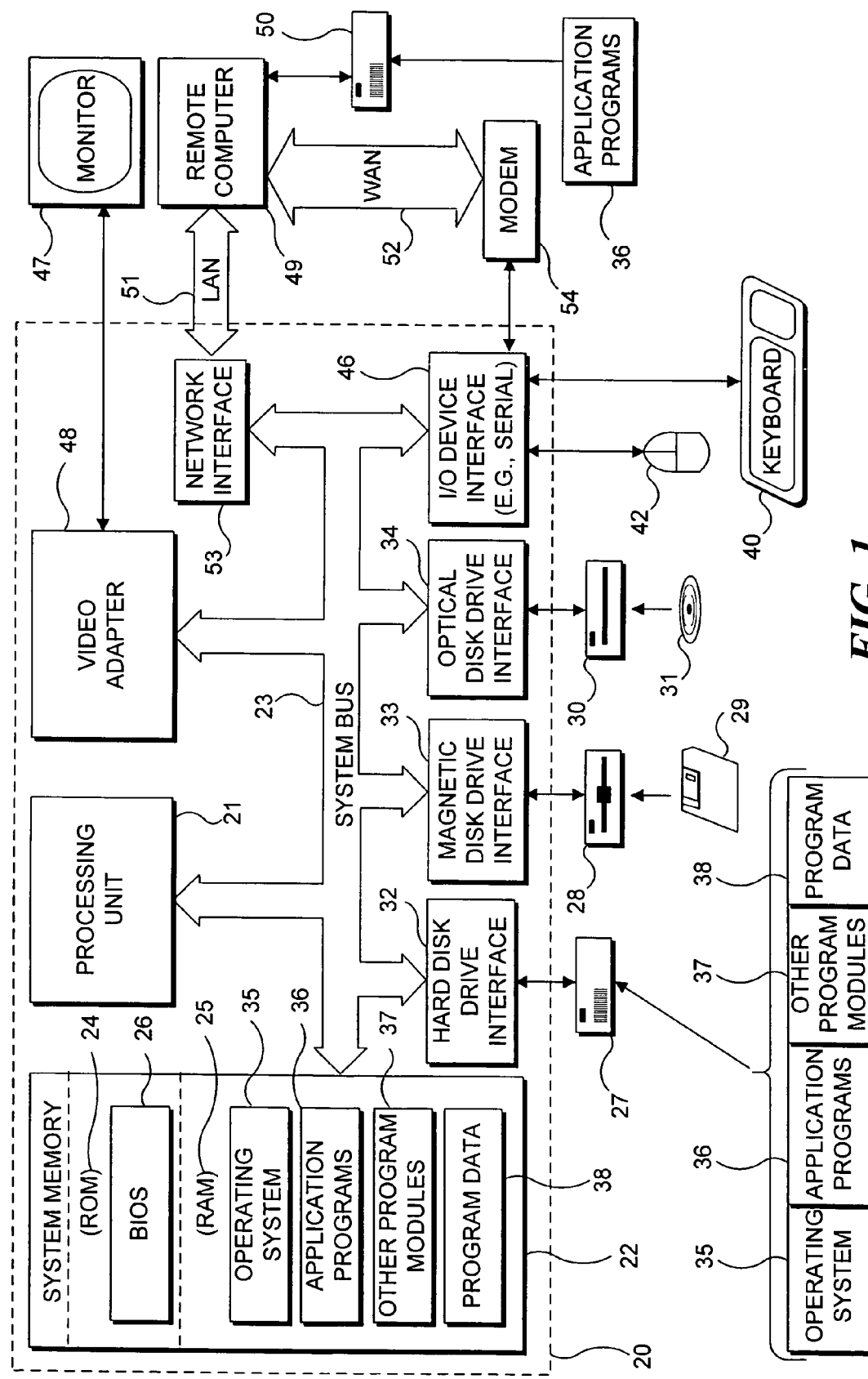
FIG. 1 is a functional block diagram of a generally conventional computing device or personal computer (PC) that is suitable for processing the input and output data used in practicing the present invention.

With reference to FIG. 1, an exemplary system suitable for implementing various portions of the present invention. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in to PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display table is also connected to system bus 23 via an appropriate interface, such as a video adapter 48. In addition to the monitor, PCs are often coupled to other peripheral output devices (not shown), such as speakers (through a sound card or other audio interface—not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Surface

Figure 2A:
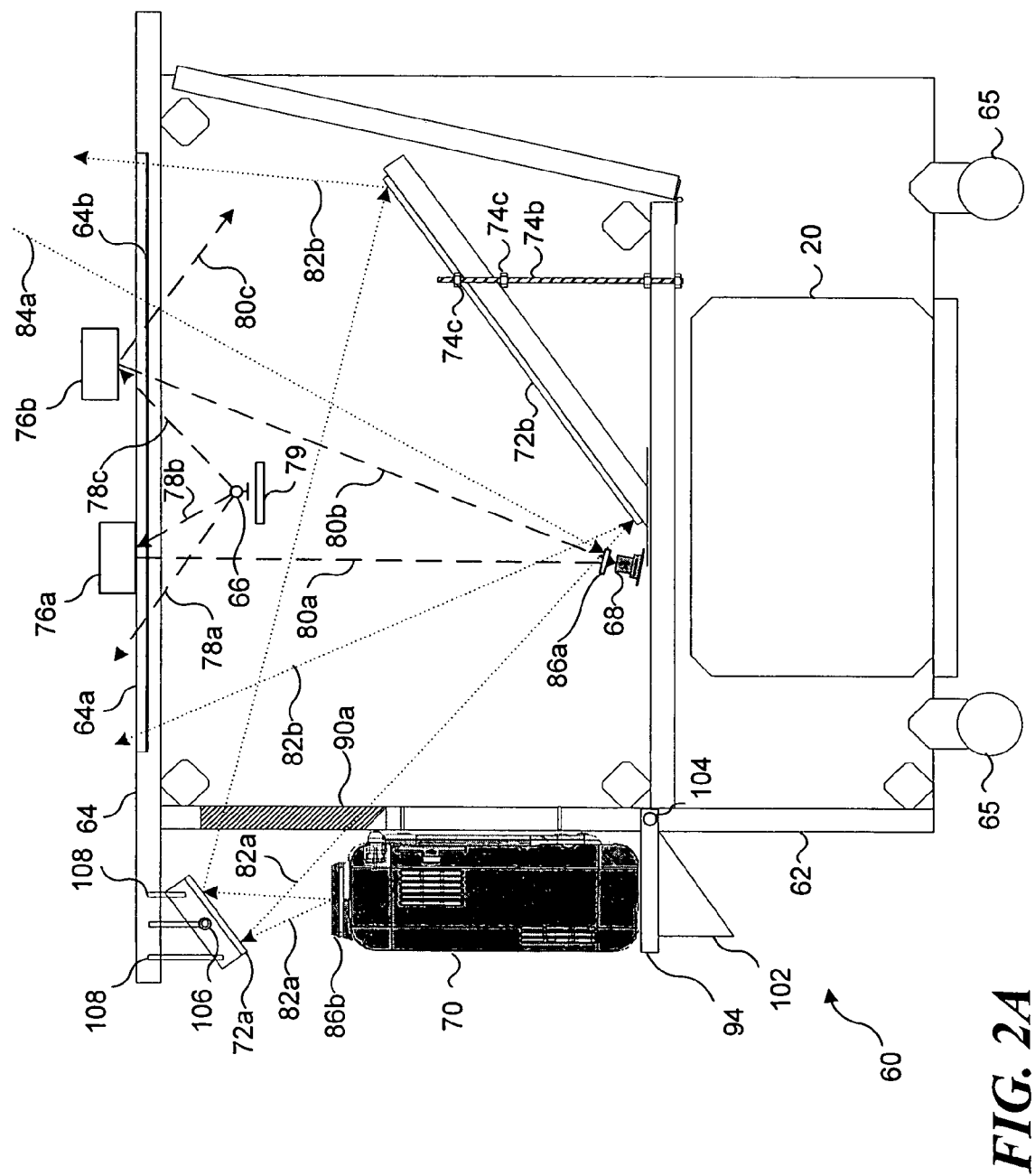
FIG. 2A is a side elevational cut-away view of a first preferred embodiment, when operating in a first mode, showing the interior of the display table, the hardware components that are included, and the paths followed by light within the display table in the first mode, and exemplary objects disposed on and above the surface of the display table.

FIG. 2A illustrates a first preferred embodiment of this invention where the user may selectively operate the display table in one of two modes. As shown in this Figure, the display table is operating in a first mode, i.e., so that the projector is projecting an image on a display surface 64a of the display table. However, if the display table is operated in a second mode, the projector will instead project a video image onto a nearby wall, a screen, or similar external surface that is suitable for viewing the video image. An exemplary interactive display table 60 is shown that includes PC 20 within a frame 62 and which serves as both an optical input and video display table for the computer. Note, however, that this invention does not require the interactive capabilities of the display table that are described below. In this cut-away Figure of the interactive display table, rays of light used for displaying text and graphic images are generally illustrated using dotted lines, while rays of IR light used for sensing objects on or just above display surface 64a of the interactive display table are illustrated using dash lines. Display surface 64*a* is set within an upper surface 64 of the interactive display table. The perimeter of the table surface is useful for supporting a user's arms or other objects, including objects that may be used to interact with the graphic images or virtual environment being displayed on display surface 64*a*. A plurality of rollers or wheels 65 are mounted to the base of frame 62 to enable the display table to be readily moved about, so that it is relatively mobile.

IR light sources 66 preferably comprise a plurality of IR light emitting diodes (LEDs) and are mounted on the interior side of frame 62. The IR light that is produced by IR light sources 66 is directed upwardly toward the underside of display surface 64*a*, as indicated by dash lines 78*a*, 78*b*, and 78*c*. The IR light from IR light sources 66 is reflected from any objects that are atop or proximate to the display surface after passing through a translucent layer 64*b* of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64*a*. The IR light produced by the IR sources may:

- exit through the table surface without illuminating any objects, as indicated by dash line 78*a*;
- illuminate objects on the table surface, as indicated by dash line 78*b*; or
- illuminate objects a short distance above the table surface but not touching the table surface, as indicated by dash line 78*c*.

Objects above display surface 64*a* include a "touch" object 76*a* that rests atop the display surface and a "hover" object 76*b* that is close to but not in actual contact with the display surface. As a result of using translucent layer 64*b* under the display surface to diffuse the IR light passing through the display surface, as an object approaches the top of display surface 64*a*, the amount of IR light that is reflected by the object increases to a maximum level that is achieved when the object is actually in contact with the display surface.

A digital video camera 68 is mounted to frame 62 below display surface 64*a* in a position appropriate to receive IR light that is reflected from any touch object or hover object disposed above display surface 64*a*. Digital video camera 68 is equipped with an IR pass filter 86*a* that transmits only IR light and blocks ambient visible light traveling through display surface 64*a* along dotted line 84*a*. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64*a* and corresponds to an image of IR light reflected from objects on or above the display surface. It will be apparent that digital video camera 68 will also respond to any IR light included in the ambient light that passes through display surface 64*a* from above and into the interior of the interactive display (e.g., ambient IR light that also travels along the path indicated by dotted line 84*a*).

IR light reflected from objects on or above the table surface may be:

- reflected back through translucent layer 64*b*, through IR pass filter 86*a* and into the lens of digital video camera 68, as indicated by dash lines 80*a* and 80*b*; or
- reflected or absorbed by other interior surfaces within the interactive display without entering the lens of digital video camera 68, as indicated by dash line 80*c*.

Translucent layer 64*b* diffuses both incident and reflected IR light. Thus, as explained above, "hover" objects that are closer to display surface 64*a* will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. Optionally, as explained below, the digital video camera can also be used for imaging objects that are external to the display table. The logical steps implemented to carry out these functions are explained below.

Figure 3:
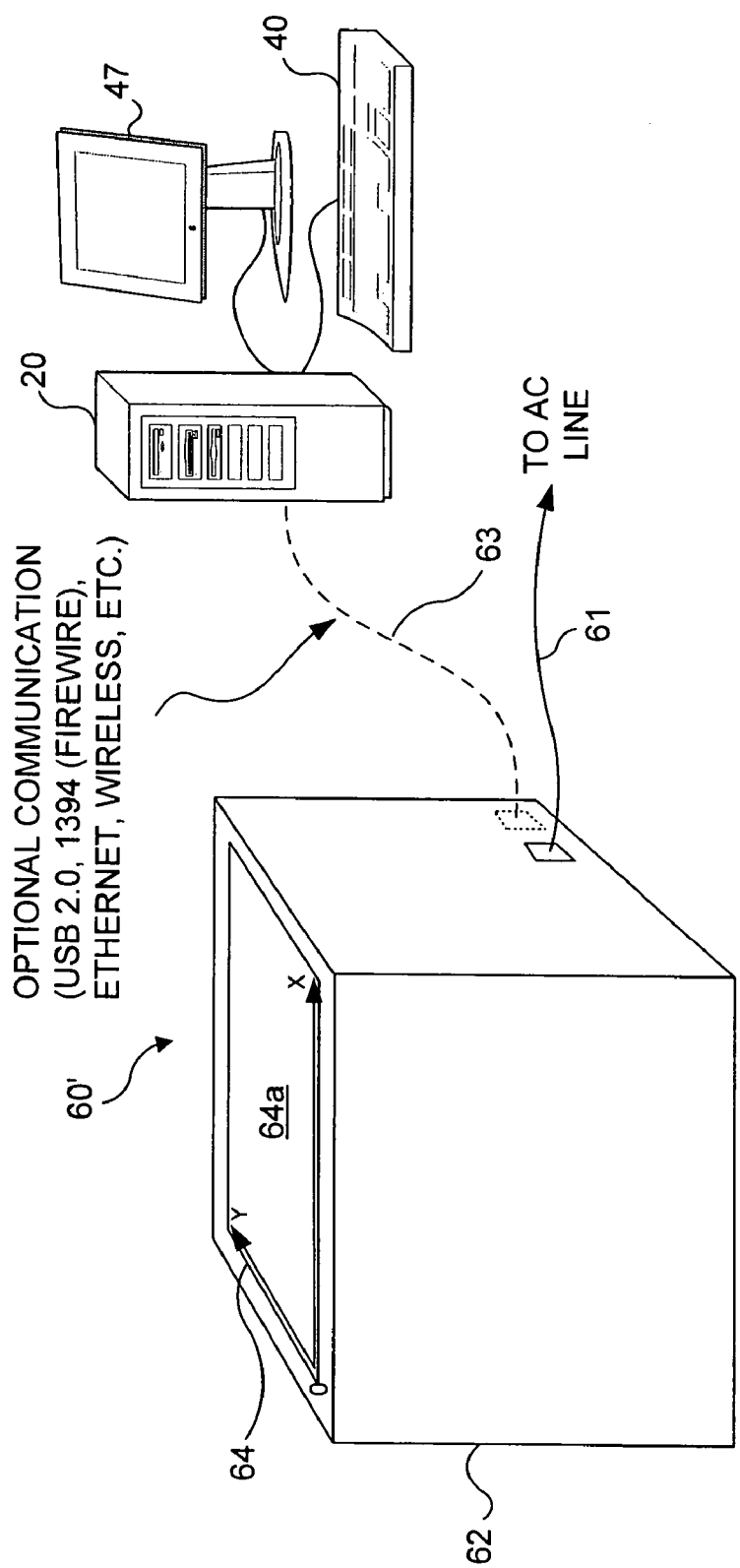
FIG. 3 is an isometric view of a display table coupled to an external PC.

PC 20 may be integral to interactive display table 60 as shown in FIG. 2A (as well at the other embodiments of the display table discussed below), or alternatively, may instead be external to the interactive display table, as shown in FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64*a*, as well as an origin indicated by "0." While not discretely shown, it will be appreciated that a plurality of coordinate locations along each orthogonal axis can be employed to specify any location on display surface 64*a*.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of any of the embodiments discussed herein) is its ability to display graphic images or a virtual environment for games or other software applications and to enable an interaction between the graphic image or virtual environment visible on display surface 64a and identify objects that are resting atop the display surface, such as an object 76a, or are hovering just above it, such as an object 76b. However, this powerful functionality is not required for the present invention.

Again referring to FIG. 2A, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing in the first mode.

Alignment devices 108 are adjustable members that can selectively be shortened or lengthened to enable first mirror assembly 72a to be aligned properly by pivoting about a pivot point 106. Alignment device 74b is also provided and includes threaded rods and rotatable adjustment nuts 74c for adjusting the angle of the second mirror assembly. These alignment devices ensure that the image projected onto the display surface is aligned with the display surface. Those skilled in the art will realize that alternate methods exist for aligning the mirror assemblies and FIG. 2A is merely an example of one of many possible mirror assembly alignment systems. In addition to directing the projected image in a desired direction, the use of these two mirror assemblies provides a longer path between projector 70 and translucent layer 64b to enable a longer focal length (and lower cost) projector lens to be used with the projector.

Figure 2B:
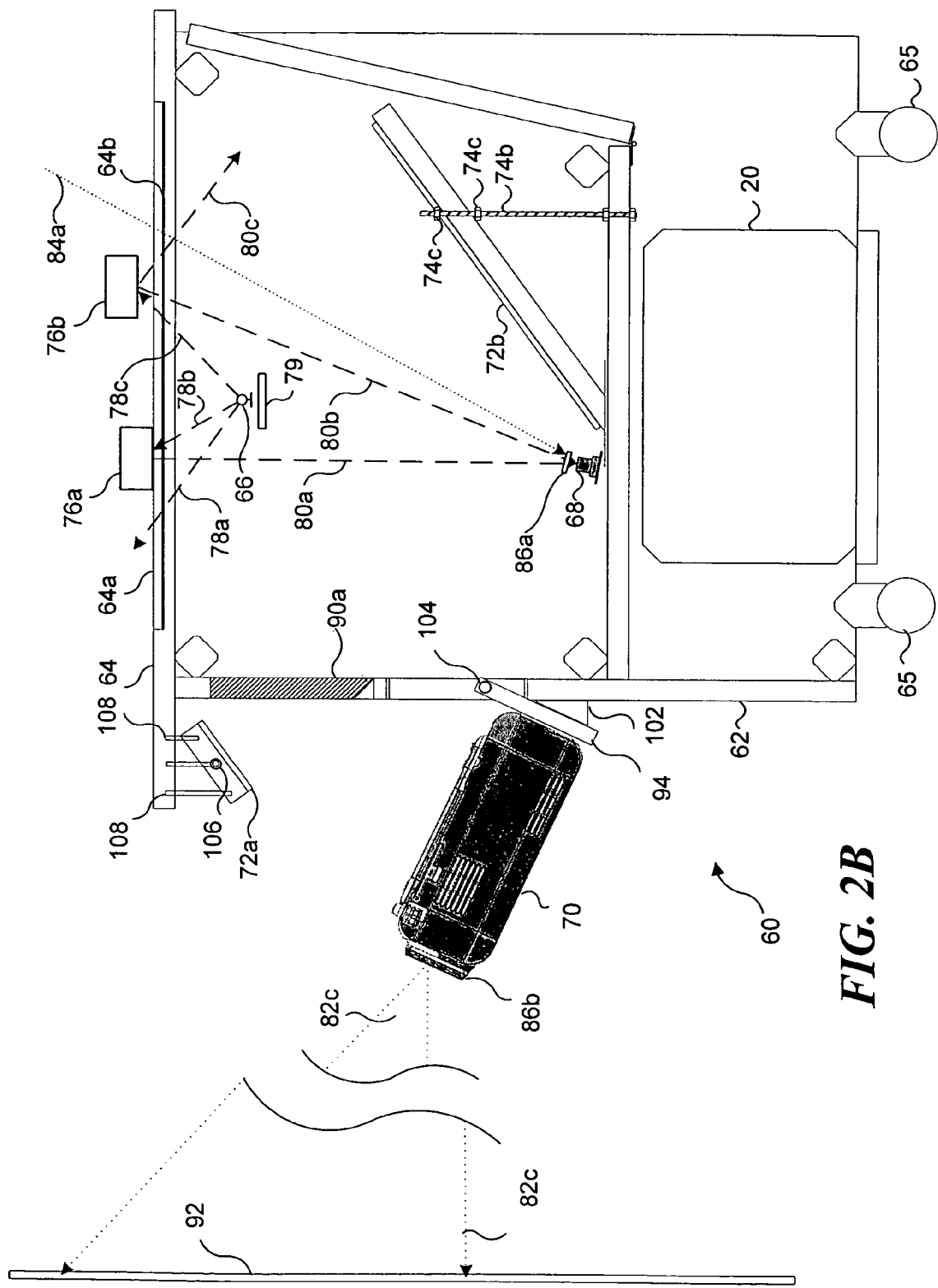
FIG. 2B illustrates the first preferred embodiment of FIG. 2A when operating in a second mode and showing the paths followed by light outside the display table in the second mode.

Turning now to FIG. 2B, operation of this embodiment in the second mode is shown to illustrate the dual functionality of projector 70. Instead of projecting light along a first path and onto the display surface as is the case when the projector is in its upright position as shown in FIG. 2A, projector 70 is rotated outwardly as shown in FIG. 2B to project light along a second path, onto an external surface 92, such as a wall of a room in which the display table is being used. Because of the mobility of display table 60, it can readily be rolled about in a user's residence for use in any desired room. Although a user may choose to utilize a pull-down (or motorized) projection screen for the external surface, those skilled in the art will recognize that external surface 92 may be any surface separate from the display table that is suitable for viewing the image.

Projector 70 is mounted on a support structure 94, which is coupled to frame 62 by way of a pivot point 104. When the user wants to change from the first mode to the second mode, i.e., when the user wants to project the image onto an adjacent wall or projection screen instead of onto display surface 64a, the user simply pivots projector 70 about pivot point 104, so that the projector is disposed in a position and at angle that enable the image to be properly projected where desired on external surface 92. A wedge 102 is shown to limit the rotation of projector 70 to a nominal desired angle, but it will be apparent that the projector can be placed in any desired angular position. Those skilled in the art will recognize that there are many suitable ways to adjustably limit the rotation angle of the projector and align the image for viewing. For example, an adjustable bracket (not shown), or an adjustable length cable can be used to limit the angular rotation of the projector about pivot point 104 in a selectively variable manner.

By using the most expensive component in display table 60 (the projector) to accomplish a dual functionality for projecting images in a home theater venue while operating in the second mode, as well as displaying images on display surface 64a when operating in the first mode as part of the interactive display system, the display table is made financially more appealing to consumers. Furthermore, its ability to be readily moved about within a home provides an advantage over fixed mount projector in a more typical home theater system.

Figure 2C:
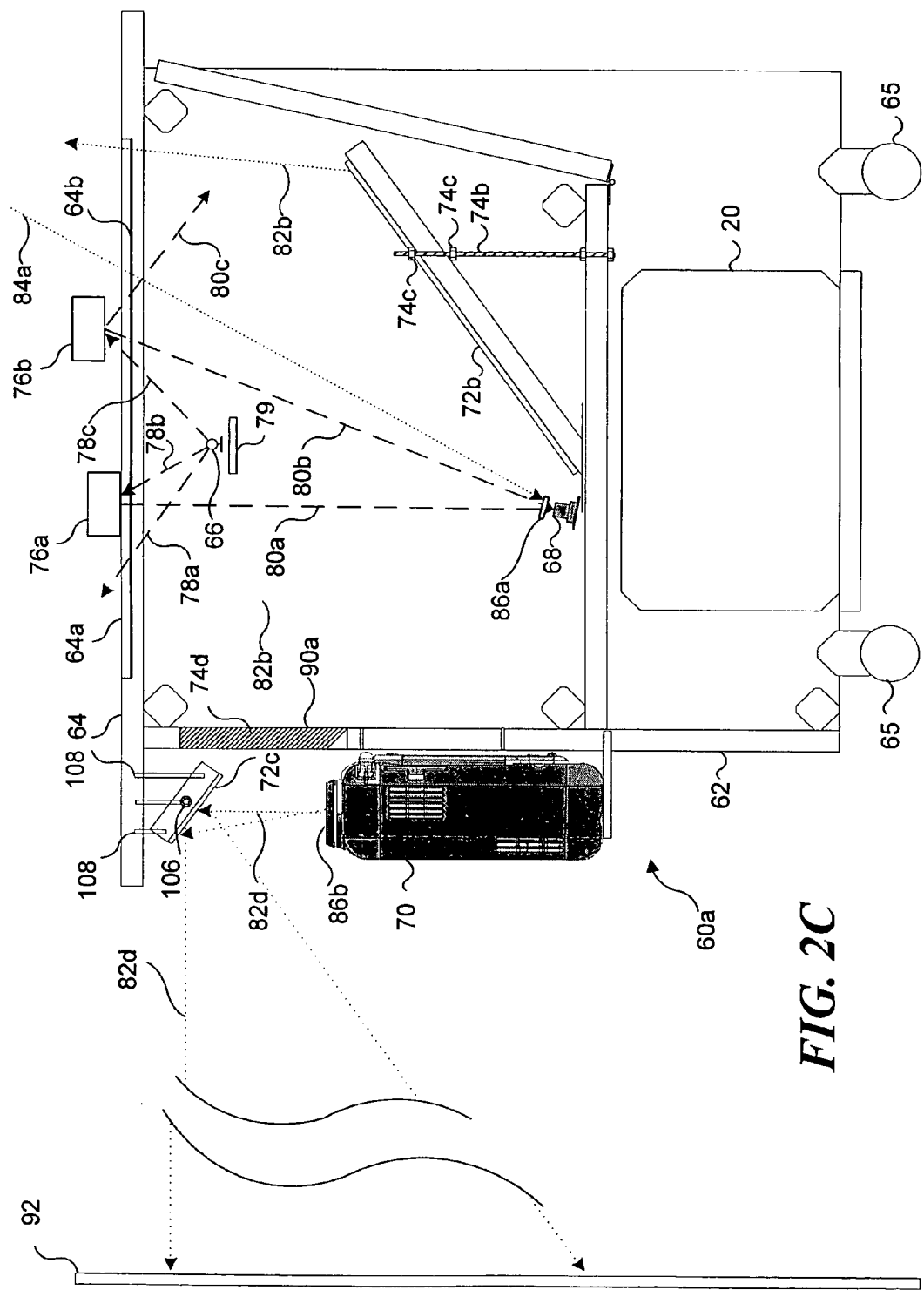
FIG. 2C is a side elevational cut-away view of a second preferred embodiment when operating in the second mode, showing the paths followed by light outside the display table in the second mode, wherein, when operating in the first mode, the second embodiment is generally configured much like the first embodiment of FIG. 2A.

A second embodiment of this invention is illustrated by FIG. 2C. Display table 60a is very similar to display table 60, as shown in FIG. 2A, except that a rotating mirror assembly 72c is selectively rotatable and is shown in a position to direct light traveling from projector 70 along a dotted path 82d and onto external wall 92. Note that mirror assembly 72c can be adjusted by way of telescoping alignment devices 108 about pivot point 106. Mirror assembly 72c rotates about pivot point 106 and telescoping members 108 are adjusted as necessary to enable the mirror assembly to be angled and positioned so that the image is displayed at a desired position on external surface 92. In this second preferred embodiment, there is no need to rotate projector 70. Instead, mirror 72c is rotated from the position shown for mirror 72a in FIG. 2A, in which display table 60' is operating in the first mode, to the position of the mirror in FIG. 2C. In summary, FIG. 2A shows the video image being projected on the display surface of display table 60a in a first mode, and FIG. 2C shows how in this second embodiment, by rotating mirror assembly 72c, the user can project the video image onto the external separate surface that is not part of the display table, without having to rotate the projector.

Turning now to FIG. 4A, another configuration for a display table 60b is shown. In display table 60b as shown in FIG. 4A, the components are configured to project an image along a first path and in a first mode, so that the light travels from the projector lens along dotted path 82e and is incident on a mirror 72e. Mirror 72e reflects the projected light onto diffusing translucent layer 64b such that the projected image is visible and in focus on display surface 64a for viewing from above by the user. A frame 62' of display table 60b is also different than frame 62 of display tables 60 and 60a in that frame 62' includes openings so that projected light traveling within display table 60b can be directed outside of the display table. An access panel 98 and an access panel 100 are folded out of the way to expose these openings when the display table is operated in a second mode, to project an image onto an external surface; however, in this FIGURE, these panels are closed since the display table is operating in the first mode. Light is not directed outside of the display table from projector 86b until the user selectively sets up the display table for the second mode of operation. Also shown in FIG. 4A, in a retracted or folded position, are mirrors 72*d* and 72*f*, which are also not used in the first mode.

FIG. 4A also illustrates a video camera 68*a*, which is in a different position than video camera 68, which is shown in FIG. 2A. However, video camera 68*a* still functions in the same manner as described above for video camera 68, including receiving IR light reflected from objects (not shown) that are on or above the table surface, so that the light is reflected back through diffusing translucent layer 64*b*, through IR pass filter 86*a* and into the lens of digital video camera 68*a*, as indicated by dash lines 80*d*. In this embodiment, video camera 68*a* is supported by a shelf 116, which is pivotally coupled to frame 62' by a pivot point 114. A wedge-shaped support 112 maintains video camera 68*a* in an appropriate angled position for imaging reflected IR light from display surface 64*a*, to detect objects on or just above the display surface. Those skilled in the art will recognize that various other mounting techniques can be employed to support video camera 68*a* and properly position it in the first mode. Also, a bracket 87 is pivotally attached at one end to access panel 100, and the opposite end of the bracket is supportingly coupled to IR pass filter 86*a*.

Turning now to FIG. 4B, the dual functionality of display table 60*b* is illustrated as display table 60*b* is shown configured in a second mode so that the image is projected along a different path toward external surface 92. In this mode, access panel 98 has been opened and mirror 72*d* has been rotated to a new position, to receive light from projector 70, which is shown as dotted lines 82*f*. This light that is incident on mirror 72*d* is reflected outside housing 62' of display table 60*b* and onto external surface 92, enabling the image conveyed by the light to be viewed on this surface. Those skilled in the art will realize that access panel 98, although shown here as folding open, can instead easily be modified to open in the opposite direction, or to slide to the side above or below the opening, so as not to interfere with the light directed from mirror 72*d* to external surface 92. FIG. 4B simply illustrates one method of providing access for the light traveling from inside display table 60*b* toward the external surface.

FIG. 4B also illustrates the dual functionality of video camera 68*a* when display table 60*b* is operated in the second mode. As shown in this Figure, the video camera can be employed for video conferencing by imaging user 96. Or a user may wish to utilize display table 60*b* to record video images for other purposes. It will be evident that the video camera can be employed to capture images of almost any object within its field of view. FIG. 4A shows the video camera being used in its first mode where it receives light from objects that are either on or hovering above display surface 64*a*. However, in its second mode, it is able to receive light from an object that is outside of display table 60*b* and not or adjacent to display surface 64*a*.

As shown in FIG. 4B, user 96 is seated in a position such that the video camera 68*a* can image the user. In this second mode of operation, mirror 72*f* has been rotated to a different position (which can be determined by an adjustable support—not shown), and access panel 100 has been opened. Again, access panel 100 can be mounted to pivot out of the opening to either side or upwardly, or can slide out of the opening. When access panel 100 is opened, IR pass filter 86*a* is moved out of the path of light from the user or other object, since the IR pass filter is coupled through bracket 87 to the access panel. In the second mode, it is desirable for the video camera to respond to visible light, and not be limited only to imaging object using IR light.

Light 110 from the user (or another object) travels along a path shown with a dash line in the Figure and is reflected from mirror 72*f* into the lens of video camera 68*a* such that the image of the user (or other object) is recorded. While operating in the second mode, the light is able to travel to video camera 68*a* from outside housing 62' because access panel 100 is open. In this embodiment, it is not necessary to pivot video camera 68*a*. Instead, mirror assembly 72*f* is rotated to the proper angle so that light from the object being imaged is reflected into the lens of video camera 68*a*. However, to image objects that are in a different position than that shown in FIG. 4B, the user may find it necessary to both pivot video camera 68*a* to a different position and rotate mirror assembly 72*f* to capture the image of the object, person, or scene that is external to display table 60*b*.

FIG. 4C illustrates an alternative approach for positioning video camera 68*a* from the position shown in FIG. 4A, to the position required in the second mode to image an external object. The same approach is used in display table 60*c* for enabling projector 70 to project an image on external surface 92, as in display table 60*b*. In this alternative embodiment of a display table 60*c*, video camera 68*a* is pivoted into a position appropriate to directly image the external object without need for mirror 72*f*, which was used in the embodiment of FIG. 4B. In the embodiment of FIG. 4C, a telescoping member 122 is coupled between frame 62' and shelf 116 and is adjustably extendable as necessary to move video camera 68*a* into an appropriate position to image the user or other object in the second mode, by pivoting the video camera about its pivot point 114. Those skilled in the art will realize there are numerous alternative ways to support video camera 68*a* and reposition it such that the image of an external user or other object can be captured. In the illustrated configuration, light 118, which is shown as a dash line traveling from user 96, will be able to directly enter the lens of video camera 68 without being reflected by mirror 72*f*. Also, IR pass filter 86*a* is rotated about the pivotal connection of bracket 87 to access panel 100, so that the IR pass filter is no longer in the path of light entering the lens of the video camera.

It should also be noted that in any of the embodiments of FIGS. 4A, 4B, and 4C, projector 70 can be operated in the second mode, independent of the video camera 60*a*. Thus, video camera 60*a* can selectively continue to be used as it was in the first mode, while projector 70 is used to project an image onto external surface 92. Similarly, when projector 70 is used in the first mode, it is also possible to selectively employ video camera 68*a* to image an external person, object, or scene.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to selectively operate a display table in one of two different modes, including a first mode in which a video image is projected on a display surface of the display table and a second mode in which the video image is projected onto a separate surface that is not part of the display table, the display table including a video camera, comprising the steps of:

(a) enabling the user to selectively change a projection light path for the video image between a first path that is used when operating the display table in the first mode, and a second path that is used when operating the display table in the second mode;

(b) projecting the video image along the projection light path selected by the user so that the video image is viewed on one of:
  (i) the display surface using the first path; and
  (ii) the separate surface using the second path;

(c) when operating in the first mode:
  (i) imaging the display surface using an infrared filter and the video camera; and
  (ii) directing an imaging field of view of the video camera along a first imaging path that includes the display surface; and (d) when operating in the second mode, imaging an object external to the display table with the video camera, such that the imaging field of view of the video camera is directed along a second imaging path that is different than the first imaging path, the step of imaging the object that is external to the display table comprising the steps of:
  (i) enabling the user to perform one of the following functions:
    (A) moving a reflective surface to redirect the imaging field of view along the second imaging path; and
    (B) moving the video camera from a first orientation directed toward the display surface, in the first mode, to a second orientation directed toward the object that is external to the display surface;
  (ii) moving a panel out of the imaging field of view of the video camera; and
  (iii) moving the infrared filter out of the imaging field of view of the video camera.

2. The method of claim 1, wherein the step of enabling the user to selectively change the projection light path includes the step of enabling the user to move a projector that produces the video image from a first position that is used for the first mode, to a second position that is used for the second mode, to change from the first path to the second path.

3. The method of claim 1, wherein the step of enabling the user to selectively change the projection light path includes the step of enabling the user to position a reflective surface to redirect the video image along the second path instead of the first path, when selectively operating the display table in the second mode.

4. The method of claim 3, further comprising the step of moving a panel of the display table out of the second path when operating the display table in the second mode, so that the video image is not prevented from reaching the separate surface by the panel.

5. A system that enables a user to selectively determine where a video image is projected, comprising:
  (a) a display surface supported by a housing;
  (b) a projector supported by the housing, the projector projecting a video image along a light path;
  (c) means for enabling a user to change the system between a first mode and a second mode of operation by altering the light path, wherein in the first mode, the projector projects the video image onto the display surface, and in the second mode, the projector projects the video image onto a separate surface that is spaced apart from the housing;
  (d) video camera that captures an image; and
  (e) means for enabling the user to change an imaging path of the video camera between a first orientation directed toward the display surface, in the first mode, and a second orientation directed toward an external object, in the second mode, wherein said means comprises one of:
    (i) a reflective surface that is moved into the imaging path of the video camera by the user, in the second mode, the reflective surface redirecting the imaging path from the display surface toward the external object; and
    (ii) a shelf that supports the video camera and is pivotally coupled to the housing, enabling the video camera to be moved by the user from the first orientation in the first mode, to the second orientation in the second mode.

6. The system of claim 5, wherein the projector is movably coupled to the housing, so that in the first mode, the projector is oriented to project the video image along the light path, so that the video image appears on the display surface, and in the second mode, the projector is moved by a user to a different orientation, to project the video image onto a separate surface.

7. The system of claim 6, wherein the projector is pivoted about an axis from a first position in the first mode, to a second position in the second mode.

8. The system of claim 5, further comprising a reflective surface that is moved by a user to change the light path from the first mode to the second mode.

9. The system of claim 8, wherein the reflective surface is used in the first mode to reflect the video image onto the display surface, and is moved to a different orientation in the second mode, to reflect the video image onto a separate surface.

10. The system of claim 8, wherein the reflective surface is not in the light path in the first mode, and is moved into the light path in the second mode, to reflect the video image toward a separate surface.

11. The system of claim 10, wherein in the second mode, the light path passes through an opening in the housing.

12. The system of claim 11, wherein the housing includes a panel that covers the opening in the first mode and is moved out of the opening in the second mode.

13. The system of claim 5, wherein the video camera captures an image of the display surface in the first mode.

14. The system of claim 5 wherein the housing further includes an opening, and a panel that is moved from the opening to enable the image of an object to be captured in the second mode.

15. The system of claim 5, wherein the video camera includes an infrared filter that is moved out of an imaging path of the video camera by a user in the second mode.

16. A system that enables a user to selectively determine where a video image is projected, comprising:
  (a) a display surface supported by a housing;
  (b) a projector supported by the housing, the projector projecting a video image along a light path;
  (c) means for enabling a user to change the system between a first mode and a second mode of operation by altering the light path, wherein in the first mode, the projector projects the video image onto the display surface, and in the second mode, the projector projects the video image onto a separate surface that is spaced apart from the housing; and (d) a video camera that captures an image, the video camera including an infrared filter that is moved out of an imaging path of the video camera by the user in the second mode.

17. The system of claim 16, wherein the housing further includes an opening, and a panel that is moved from the opening to enable the image of an object to be captured with the video camera in the second mode.

* * * * *